(12) United States Patent
Deichler, Jr.

(10) Patent No.: US 6,708,604 B1
(45) Date of Patent: Mar. 23, 2004

(54) COLLAPSIBLE SMOKER AND OVEN DEVICE

(76) Inventor: Richard A. Deichler, Jr., 1550 Mother Grundy Truck Trail, Jamul, CA (US) 91935

( * ) Notice: Subject to any disclaimer, the term of this patent is extended or adjusted under 35 U.S.C. 154(b) by 0 days.

(21) Appl. No.: 10/444,454

(22) Filed: May 22, 2003

(51) Int. Cl.[7] ............................ A47J 37/00; A47J 37/07
(52) U.S. Cl. ......................... 99/482; 99/449; 99/450; 126/9 R; 126/25 R
(58) Field of Search .............. 99/339, 340, 419–421 V, 99/446–450, 481, 482; 126/9 R, 25 R, 25 AA, 41 R, 29, 30; 312/263, 264, 400; 211/118, 181.1; 110/102, 118

(56) References Cited

U.S. PATENT DOCUMENTS

| | | | |
|---|---|---|---|
| 3,272,346 A | | 9/1966 | Michaud |
| 3,856,374 A | | 12/1974 | Christen |
| 4,508,096 A | | 4/1985 | Slattery |
| 4,598,690 A | * | 7/1986 | Hsu .............................. 99/482 |
| 4,646,711 A | * | 3/1987 | Oliphant ....................... 99/482 |
| 4,924,844 A | * | 5/1990 | Bransburg .................... 126/9 R |
| 4,979,436 A | | 12/1990 | McGowan |
| 5,103,799 A | | 4/1992 | Atanasio |
| 5,279,214 A | * | 1/1994 | Lamendola .................... 99/445 |
| 5,355,782 A | | 10/1994 | Blanchard |
| 5,460,159 A | * | 10/1995 | Bussey ........................ 126/25 R |
| 5,485,816 A | * | 1/1996 | Cox et al. ................... 126/25 R |
| 5,575,195 A | * | 11/1996 | Foxford ......................... 99/340 |
| 5,588,355 A | | 12/1996 | Mead et al. |
| 6,439,111 B1 | * | 8/2002 | Lu ................................ 99/449 |

* cited by examiner

Primary Examiner—Timothy F. Simone
(74) Attorney, Agent, or Firm—Donn K. Harms

(57) ABSTRACT

A light, foldable food cooker that will move from an expanded position to a collapsed position which can be used as a barbeque, stove, oven and smoker, and still fit into a confined area is very desirable. The device has a folding center section assembly made up of side walls, back walls, front doors and support plates pivotally mounted to fold out quickly, with a cover on top. A firebox provides both a spark and ashtray which is easily inserted in the expanded device. With food racks, water tray and fire box, this device can be assembled and disassembled in minutes. The incorporation of the water tray in the smoking process makes a tremendous difference in the quality of smoked meat, especially with fresh fish where the product is tender and moist.

20 Claims, 2 Drawing Sheets

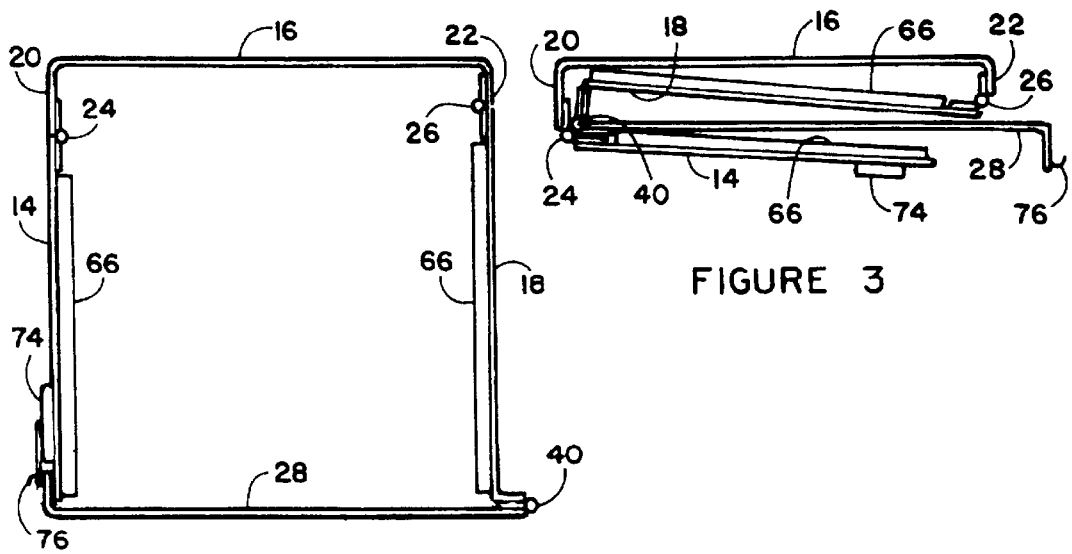
FIGURE 2
FIGURE 3
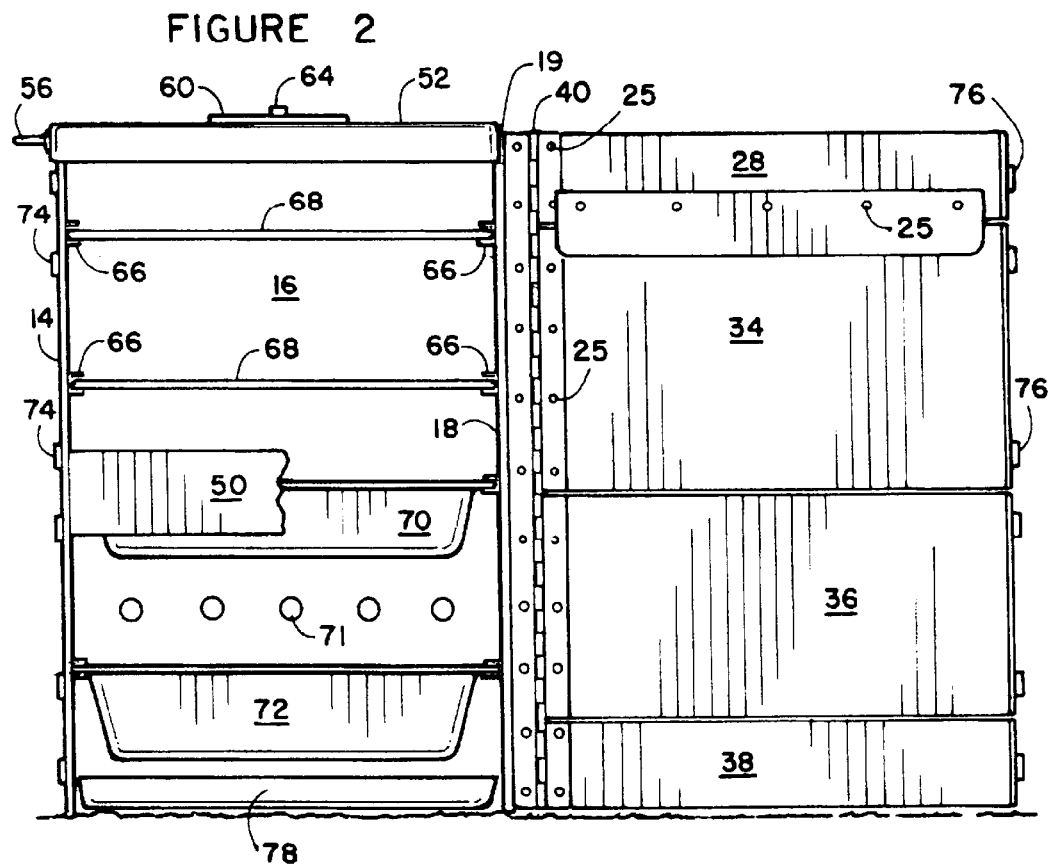
FIGURE 4

COLLAPSIBLE SMOKER AND OVEN DEVICE

FIELD OF THE INVENTION

This invention relates to the field of portable cooking devices. More particularly it relates to a device which is collapsible and operates as a smoker and oven or a barbeque for use in cooking food.

In the field of camping and river rafting, portability and convenient storage of equipment is essential, especially going into remote wilderness areas where dimensional limitations of the boats limit the size of equipment which may be taken upon the trip. In order to be considered for use on camping and river expeditions, equipment must be either miniature in size or such equipment must be collapsible so that it can be compressed into small available storage areas. Smoked food on these outings has become a highlight of the camping activities, with smoked fish on a river rafting trips being something all those participating will enjoy and remember. Problems arise, however, with existing food smokers due to their large and bulky size and prohibitive weight. Smokers that do collapse are generally small devices fit only to cook for one or two persons and lack the convenience of a water tray to maintain humidity of the food during the cooking process. This is especially important to keep the smoked meats, especially fish, moist during and after cooking, and without the provision of a water tray food being smoked rapidly becomes hard and dry. The adaptation of the water tray to the collapsible smoker allows the food cooked to have the humidity required, especially with fish, to remain soft and moist and further allows the smoker to be stored in the limited confines of a raft or boat. Additionally important, especially on river or camping trips to the pristine wilderness, is the provision of a means to collect ashes from the spent charcoal or wood fuel so that it may be easily carried out of the back country. Such debris removal is required in many wilderness areas as a prerequisite to admission.

Additionally, since space is limited on camping and rafting trips, cooking devices are especially utilitarian if they can provide a plurality of uses. In addition to its collapsible nature, the device herein disclosed converts easily to a barbeque or baking oven to allow users multiple options when cooking on trips.

BACKGROUND OF THE INVENTION

As noted, in the field of camping where the inventor specializes in river rafting, in particular taking large groups of people on river rafting trips into remote wilderness areas, it has become apparent there is a need for a light-weight portable smoker, barbecue and oven combination that will fold together and be easily transported. When packing for camping or rafting trips, space is at a premium and single purpose devices that take up a lot of room are generally not used, whereas a device that is easily stored and has a number of applications is an asset to any camping trip. At some camping locations it is mandatory when vacating a campsite that nothing be left at the campsite including ashes from campfires on the ground, or the ashes must be deposited into a proper receptacle. The device herein disclosed provides a cooking apparatus that will be easily assembled by folding together the major components with two brackets inserted to restrain the devices' configuration, not requiring any tools for assembly. The cover is simply placed on top of the unit, and the spark and ashtray is slid into position at the bottom with the racks, water tray and firebox sliding within the central chamber on common rails attached to the side walls.

Additionally, it is essential for cooking devices that are routinely moved and assembled to maintain all of the components holding them together in one place. To that end, the disclosed device has been designed with most of the parts required of it being attached together. The attached components are easily folded into position for a quick assembly and disassembly, and all additional parts are large enough that they easily slide into position. The device can be constructed in one preferred embodiment in a large configuration to allow cooking for larger parties and in another preferred configuration in a smaller version of the large group smoker with the same convenience and capabilities for single family outings.

A number of devices have been manufactured or designed in the past to address the need for such portable cooking devices.

U.S. Pat. No. 5,588,355 (Mead) teaches a large sized smokehouse for home use that is simple and inexpensive to build. Mead is described as a freestanding smokehouse, which can be collapsed from its open or assembled configuration to a closed or disassembled compact configuration. Mead however lacks the water tray and spark protection ash collection tray and requires a size that is large and teaches a very heavy unit, even when in the compacted state. Even in its collapsed state, Mead is too big and cumbersome to take on a camping or rafting trip where weight and size are so very important. The smokehouse does not have the capability of folding into position quickly.

U.S. Pat. No. 4,508,096 (Slattery) teaches a cooker assembly that includes a rectangular fire pan and a cover that may enclose the other parts of the assembly when they are packed for storage. While Slattery collapses, it lacks the extended cavity needed to adequately smoke food products, and it does not have the capability of adding the water tray to provide the moisture to the process. Further, the firebox on cookers should be vented from below in order to burn properly, allowing the sparks and ash to fall under the fire pan. The Slattery unit does not have the spark and ashtray to safely and properly catch and dispose of the ash, and it does not hinge easily for assembly or disassembly.

U.S. Pat. No. 4,979,436 (McGowan) teaches a smoker and baking apparatus which is characterized by a cabinet having an outer shell and an inner shell that define a smoke channel therebetween. McGowan however, does not have the spark and ashtray which would be required for use on camping trips, especially to wilderness areas, nor the provided capability of retaining the ashes within for proper disposal.

U.S. Pat. No. 5,355,782 (Blanchard) describes a smoke generator machine to generate smoke from wood or similar organic matter. The smoke produced is intended for supply to food smoking kilns. The smoke generator could be used to generate smoke from a variety of combustible materials for other conceivable practical purposes or for research purposes. While such food smoking kilns are used in commercial preparation of large quantities of food products, they would not be practical for use in the field of outdoor camping.

U.S. Pat. No. 3,856,374 (Christen) discloses an electric food smoker which can be readily and quickly assembled or disassembled. However, Christen teaches an electric device and it is not reasonable to expect that it could be taken on camping trips, much less being used on river rafting trips. This device also does not incorporate a fire box, a spark or ashtray or water tray within its internal cavity.

U.S. Pat. No. 5,103,799 (Atanasio) describes a collapsible charcoal wire frame barbecuing grill. However, this device would not be useable as a folding smoker, barbecue, oven combination device so described in this disclosure.

Thus, there is a continuing need for a new lighter weight, more functional, combination smoker and cooking device with a broader range of capabilities that comply with the increasing stringent requirements to keep our campgrounds, lakes and rivers in as pristine and natural state as possible. Such a device should be easily collapsed for storage in the smallest area and easily reassembled during the short time allotted on camping trips to cook. Such a device should accommodate collapse and reassembly by attaching the majority of the components required for assembly to each other to thereby avoid loss of parts. Such a device should further provide a means for water storage during cooking to keep food moist and a means for collection of ashes and sparks to thereby avoid contamination of the wilderness and to ease the user's ability to collect disposables for removal from the area.

SUMMARY OF THE INVENTION

The present invention accomplishes its desired objectives by providing a simple, light-weight collapsible smoker, barbecue, oven combination device that can easily and quickly be assembled and disassembled. When camping in remote areas, all the equipment should compress into as tight an area as possible, especially in river rafting where all the camping gear and supplies for several days must be stowed on the rafts. Light equipment that can perform several tasks on these camping trips is especially useful. With this device in the mornings, by moving the fire box to just below the top grill and taking off the top cover, the device converts to a stove where frying pans and grills are used. The sides form a wind break. The device works in this same configuration as a barbecue in the evening meals. At noon, the device being reassembled with the top cover in place and the firebox moved to the lower most position and the water tray removed, works equally well as a warming or baking oven. But the specialty of the device is in the fully assembled configuration with the water tray in position, being used as a smoker. With the incorporation of the water tray in the application of smoking meat, especially fish, the product remains moist and soft as compared to the hard, tough products of most camping smokers. In all the configurations of the device, the spark and ashtray will be used to catch all the ash falling through the vent holes in the firebox. Then all the ash and coals in the firebox and ashtray are to be disposed of properly leaving no indication of the fire site. It has become extremely critical in fire sensitive areas that cooking be done in an approved device and the coals and ashes be disposed of properly, even in some areas where they must be taken out of the area by the campers.

The majority of the central components of the smoker, barbecue, oven combination device are attached to each other by the means of piano hinges, forming the folding center section assembly with the doors and support plates attached. The top cover with handles and an adjustable metering vent rests on top of the folding center section assembly, adequately sealing the chamber without using any fastening means. The spark and ashtray placed within the confines of the back and side walls seals the bottom of the device and is accessible by means of the hinged bottom support plate or firebox access door. The front of the device is comprised of a hinged top support plate, the food chamber access door, the firebox access door and the hinged bottom support plate, all commonly hinged to the right side wall. The food racks, water tray and firebox all slide within the central chamber by the common means of guide rails attached on the left and right side walls of the device. Support brackets across the front of the food chamber and the water tray are all that is required to restrain the device in the square configuration by sliding into retainer slots attached to the left and right side walls respectively. A plurality of holes on the left side wall, right side wall, and back wall, adjacent to the firebox, supply adequate ventilation to maintain the combustion process. By the means of a plurality of holes in the adjustable metering vent plate attached to the top cover, and a plurality of holes in the cover, rotating the vent plate allows the exhaust smoke and heat within the food chamber to be controlled, retarding the combustion process. A plurality of holes in the bottom of the firebox allows that the air passes through the fire for complete burning of the combustible material within. These holes in the bottom of the firebox will let some sparks and ash fall below the firebox requiring the need for the spark and ashtray below.

It is therefore an object of this invention to provide a collapsible lightweight, multi-purpose food cooking and smoking device for wilderness or remote camping.

Another object of this invention is the provision of such a device that will assemble and disassemble by folding its major components outward and simply inserting the retaining brackets, thus requiring no tools.

A further object of this invention is to supply a lightweight folding device, capable of smoking food with a means to control the humidity of the food being cooked such as a water tray to thereby keep food moist.

Yet another object of this invention is to supply a cooking device with a means to collect sparks and ashes to safely catch and retain anything falling below the firebox holding the burning fuel.

A additonal object of this invention is, to supply a lightweight folding device that will pass stringent fire and safety requirements for wilderness camping where fire danger is a continual concern.

These together with other objects and advantages, which will become subsequently apparent, reside in the details of the construction and operation as more fully hereinafter described and claimed, reference being had to the accompanying drawings forming a part thereof, wherein like numerals refer to like parts throughout.

BRIEF DESCRIPTION OF THE DRAWING FIGURES

FIG. 2 depicts a plan view of the folding center section assembly only, in the extended position.

FIG. 3 depicts a plan view of the folding center section assembly in a folded or collapsed position for storage and transport.

FIG. 4 depicts a front view of another preferred short embodiment of the disclosed device.

DETAILED DESCRIPTION OF THE PREFERRED EMBODIMENTS

Figure 1:
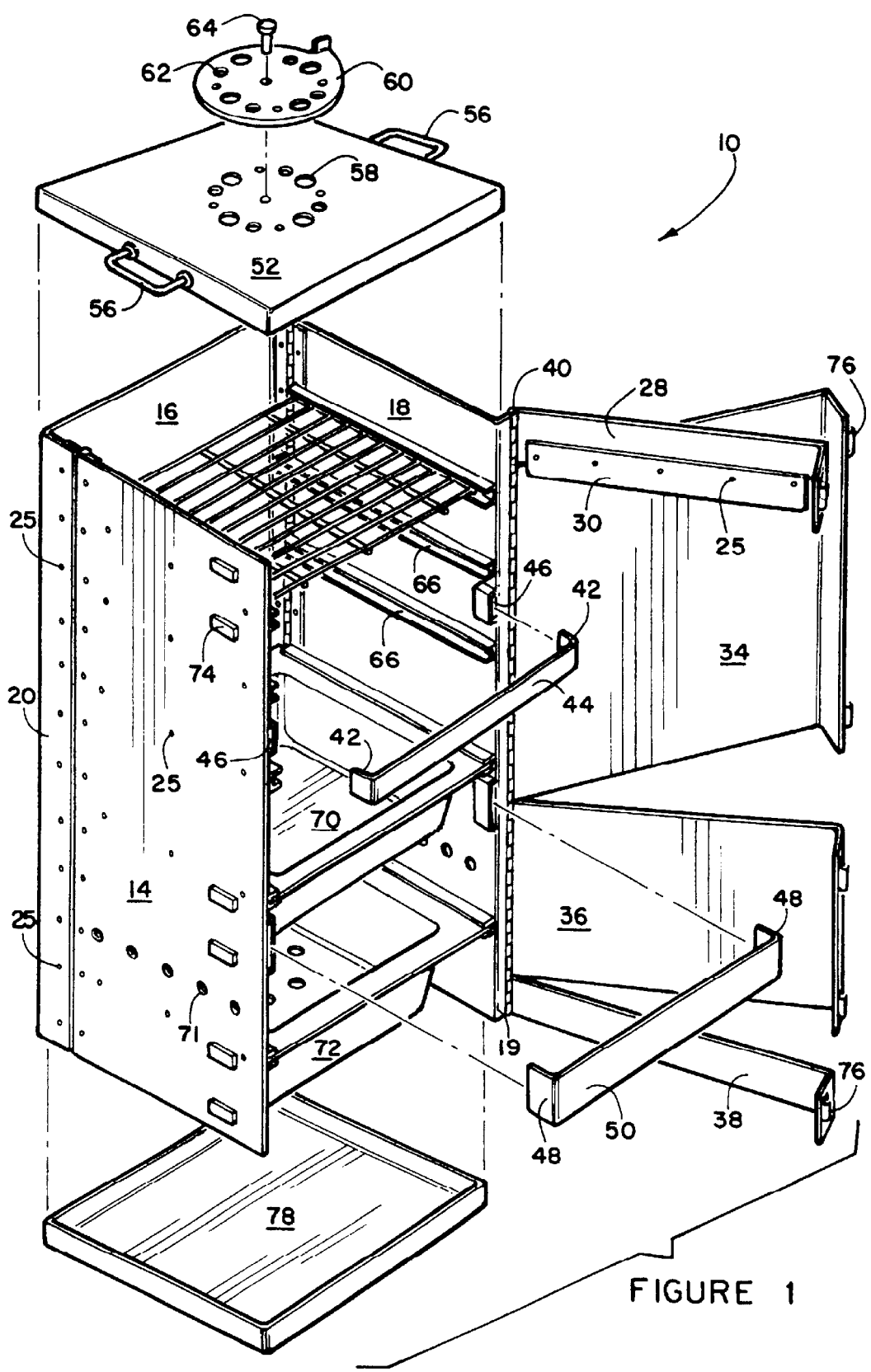
FIG. 1 depicts an exploded perspective view of the folding smoker, barbecue, oven, combination device.

Referring now to the drawing FIG. 1 showing an exploded perspective view of the folding smoker, barbecue, oven combination which is provided by the disclosed device 10. The folding center section assembly 12 is composed of a left side wall 14, a back wall 16, and a right side wall 18. Back wall 16 has a long angled projection 20 on the left side, connected to the left side wall 14 by the means for hinged engagement such as piano hinge 24 that is attached by means of fastening such as mechanical fasteners 25. Those skilled in the art will realize that where in this disclosure a means of fastening is desigated to hold parts together, other means for fastening could be used such as rivets, or welding, or the like, and any such means of fastening which would operationally hold the described components together is anticpated.

Back panel 16 has a short angled projection 22 forward of the interior surface of the back panel on its right side, connected to the right side wall 18 by a similar means for fastening such as piano hinge 26 shown attached by a means for fastening such as fasteners 25. The front of the folding center section assembly 12 features in the current preferred mode a hinged top support plate 28 with sealing plate 30, permanently attached by means of fasteners 25, to seal the upper portion of the central food chamber 32. In addition, the food chamber access door 34, firebox access door 36, and hinged bottom support plate 38, complete the front section. As shown, all the door and support components of the front of the device 10 are commonly hinged or otherwise rotationally engaged to the side wall 18 with the right front piano hinge 40 mounted with fasteners 25. In a current preferred mode of the device 10 a short hingewall 19 projects at an angle substantially normal to the sidewall 18 and provides not only the mounting area for the hinge 40 or similiar rotational mount, but also provides more rigidity to the front of the device 10 at the engagement of the rotating components and the sidewall. The side of front piano hinge 40 attaching to bracket 28, food access door 34, firebox access door 36, and bottom support plate 38 should be cut between each, while the side attaching to side wall 18 will be continuous. Thus the doors and brackets can open independently while all are commonly attached to side wall 18 which remains substantially rigid due to the hingewall 19 supplying support from its normal engagement or projection from the sidewall 18.

The folding center section assembly 12 is held together in the extended or assembled position by a bracket means shown as central support bracket 44, and by inserting the end tabs 42 of central support bracket 44 into mating central bracket retainer slots 46. This slot and bracket engagement provides a means of removable engagement of the central support bracket to the two sidewalls. Additional support to the device 10 when in the extended position is accomplished by inserting tabs 48 of water tray support bracket 50 into retainer slots 52. With the brackets 44 and 50 in place, the folding center section assembly 12 is held in a substantially rigid extended configuration allowing the doors to open freely.

Once in the extended position, the top cover 52 is then placed over the center section assembly 12 with the turned down edge flanges 54 forming a means for sealed engagement therebetween, and since the parts are also frictionally engaged, a fastening means is not required to hold them together. If the hingewall 19 is used as shown in FIG. 1, a notch would be placed in one of the hingewall 19 or the top cover 52 to allow the top cover 52 to sealably engage on the top end of the device 10 and allow the rotating components on the front to still open when the top cover 52 is attached. Handles 56 are especially useful as an aide in the positioning of top cover 52 over assembly 12. A controllable means to vent the central food chamber 32 is currently provided by a plurality of different sized orifices 58 in top cover 52 to provide such adjustable venting when the adjustable metering vent plate 60, also with a plurality of matching orifices 62, is rotated around mounting screw 64. The volume of heat and smoke that exit the central food chamber 32 is thereby precisely controlled.

Guide rails 66 are attached to side walls 14 and 18 by the aforementined means for fastening such as fasteners 25. These guide rails provide a means for slideable engagement of one or more food racks 68 with the side walls which thereby horizontally slide within the central food chamber 32 on matching guide rails 66 attached to side walls 14 and 18. Although three sets of rail guides 66 are shown for the food racks 68, it is understood that the limitation of racks is determined only by the height of the device 10 and that more or less might be slidably engaged with the side walls depending on the size of the unit. The water tray 70 and the firebox 72 also will slide horizontally into the central chamber 32 similar guide rails 66 providing a means for slideable engagement with the sidewalls. Firebox 72 will be slid into guide rails 66 adjacent to the top grill if it is desired to allow the device to function as a barbecue or stove rather than a smoker. A plurality of orifices 71 are shown adjacent to firebox 70 in its first or lowermost position for smoking and are operatively positioned to provide a means for air entry to the fire box 70 during smoking and are positioned on side walls 14 and 18 and across back wall 16.

All the hinged doors and braces mounted to side wall 18 by hinge 40 also will engage commonly to side wall 14 by the means of quick release clasps 74 which engage with catch mechanisms 76 on the aforementioned doors and brackets thereby providing a means to hold the doors in a closed position and in substantially sealed engagement at their distal ends with the side wall 14 through frictonal engagement of the doors to the sidewall. The engagment of the clasps 74 with the catch mechanisms 76 also allows for opening of the doors for access to the internal compartments of the device 10. The spark and ashtray 78 sealably engages the bottom of the device 10 in the extended position, and once in this position with the top on and the doors closed, the device 10 works especially well for smoking, in that the intake through the orifices 71 provides the air to the fuel in the firebox 72 and the smoke generated thereby flows by induction to the orafices 58 in the top which can be controlled for flow in the aforementioned fashion.

In plan view, FIG. 2, the folding center section assembly 12 is shown in the extended position without the top plate 52, spark and ashtray 78, racks 68, water tray 72 or firebox 72, in their respective positions. This best shows the communication of the internal cavity formed between the side walls from the bottom to the top of the device and the flow that heat and smoke would make.

FIG. 3 also in plan view, similarly displays the folding center section assembly 12 as in FIG. 3, but in the device's unique folded or collapsed position. This view clearly illustrates the short angled projection 22 extending from the back wall 16 pivotally attached to right sidewall 18 at a back edge with back piano hinge 26 with right side wall 18 in the stored position. Notably this view shows the length of side wall 18 being shorter than back wall 16, because of the projection 22 and allowing it to fit within the confines of the short and long angled edges 20 and 22. Also, because the long angled projection 22 is wider than the short angled projection 20, it forms a storage cavity for the sidewall 18 and its attached door, behind the left sidewall 14 which is attached to a longer angled edge 22, when it is placed in the collapsed position. This use of a longer angled edge 22 and shorter angled edge 20 also makes it substantially impossible to fold up the device 10 wrong since the right sidewall 18 must be folded since folding the left sidewall 14 will place the distal edge of the left sidewall 14 adjacent to the hinge attachement of the right sidewall and prevent it from being rotated or making it obvious that it is in the wrong position to the user. Also, the formation of the cavity for the folded right sidewall 18 and attached doors makes the device 10 more compact in the collapsed postion. The front doors and brackets hinging on right side, front piano hinge 40, shown in alignment with support plate 28, lay flat against side wall 18. With the added length of angled projection 20, left side wall 14 lays flat against the front doors and brackets shown in alignment with support plate 28. All of the major parts of the device 10 are also shown connected which eliminates losing of parts when moving to and from the collapsed position.

FIG. 4 depicts a front view of another preferred embodiment which is somewhat shorter in height with only two food racks 68 positioned within guide rails 66. This embodiment would have all the attributes of the larger version with the limitation of only using a single support bracket 50 adjacent to water tray 70. It would be especially useful when the larger capacity of the large embodiment of the device is not needed such as when cooking for smaller groups. Conversely, the larger preferred embodiment would be especially useful where large groups are being served food since it can accommodate more food to be smoked, baked, or barbequed at once.

While the present invention has been described herein with reference to particular embodiments thereof, a latitude of modifications, various changes and substitutions are intended in the foregoing disclosure, and it will be appreciated that in some instances some features of the invention will be employed without a corresponding use of other features without departing from the scope of the invention as set forth.

What is claimed is:

1. A portable collapsible cooking apparatus comprising:
    a back wall, said back wall having a top edge, a bottom edge, a first side edge, a second side edge, and an interior surface;
    a first sidewall, said first sidewall having a top edge, a bottom edge, a first side edge, a second side edge, and an interior surface;
    a second sidewall, said second sidewall having a top edge, a bottom edge, a first side edge, a second side edge, and an interior surface;
    means for rotational engagement of said first side edge of said back wall to said first side edge of said first sidewall;
    means for rotational engagement of said second side edge of said back wall to said second side edge of said second sidewall;
    at least one support plate having a first end, a second end, a top edge, and a bottom edge;
    means for rotational engagement of said support plate at said first edge, to a first mounting point at said second side edge of said first sidewall;
    means for releasable engagement of said second end of said support plate, to said first side edge of said second sidewall;
    at least one door, said door having an attachment edge, a distal edge opposite said attachment edge, a top edge, and a bottom edge;
    means for rotational engagement of said engagement edge of said door to a second mounting point at said second side edge of said first sidewall;
    said cooking apparatus having a collapsed position and having an expended position;
    a top wall, having four side edges, an interior surface and an exterior surface;
    means for releasable sealed engagement of three sides of said top wall to said top edge of said first sidewall, said top edge of said second sidewall, and said top edge of said rear wall respectively, when said cooking apparatus is in said expended position;
    a bottom wall, said bottom wall having four side edges, an interior surface and an exterior surface;
    means for releasable sealed engagement of three sides of said bottom wall to said bottom edge of said first sidewall, said bottom edge of said second sidewall, and said bottom edge of said rear wall respectively, when said cooking apparatus is in said expended position;
    at least one rack, said rack cooperatively engageable with said first sidewall and said second sidewall when said cooking apparatus is in said expanded position;
    a firebox, said firebox insertable between first sidewall and said second sidewall when said cooking apparatus is in said expanded position;
    an interior cavity defined by the area between said first sidewall, said second sidewall, and said back wall, top wall and said bottom wall when said cooking apparatus is in said expanded position with said top wall and said bottom wall mounted;
    means for removable engagement of said distal end of said door to said second side edge of said second sidewall when said door is rotated to a closed position; and
    means to control the airflow into and out of said interior cavity when said top and bottom are mounted and said door is in said closed position whereby combustible fuel may be burned in said fire box and air entering and exiting said interior cavity may be regulated to thereby control cooking of any food occupying said rack.

2. The portable collapsible cooking apparatus of claim 1 further comprising:
    a mounting wall projecting substantially normal from said second side edge of said first sidewall; and
    said a first mounting point, said second mounting point, and said third mounting point, being located upon said mounting wall.

3. The portable collapsible cooking apparatus of claim 1 further comprising:
    a water tray positionable between said fire box and said top wall when said cooking apparatus is in said expanded position.

4. The portable collapsible cooking apparatus of claim 2 further comprising:
    a water tray positionable between said fire box and said top wall when said cooking apparatus is in said expanded position.

5. The portable collapsible cooking apparatus of claim 1 wherein said means to control the airflow into and out of said interior cavity comprises:
    apertures communicating through at least one of said first side wall or said second side wall at a position adjacent to said firebox;
    exit apertures communicating through said top wall; and
    means to adjust the total area of said exit apertures.

6. The portable collapsible cooking apparatus of claim 2 wherein said means to control the airflow into and out of said interior cavity comprises:

apertures communicating through at least one of said first side wall or said second side wall at a position adjacent to said firebox;

exit apertures communicating through said top wall; and means to adjust the total area of said exit apertures.

7. The portable collapsible cooking apparatus of claim 3 wherein said means to control the airflow into and out of said interior cavity comprises:

apertures communicating through at least one of said first side wall or said second side wall at a position adjacent to said firebox;

exit apertures communicating through said top wall; and means to adjust the total area of said exit apertures.

8. The portable collapsible cooking apparatus of claim 4 wherein said means to control the airflow into and out of said interior cavity comprises:

apertures communicating through at least one of said first side wall or said second side wall at a position adjacent to said firebox;

exit apertures communicating through said top wall; and means to adjust the total area of said exit apertures.

9. The portable collapsible cooking apparatus of claim 1 wherein said means for rotational engagement of said first side edge of said back wall to said first side edge of said first sidewall comprises:

a first mounting wall extending substantially normal from said back wall for a first distance; and a hinge engaged with both said first mounting wall and said first sidewall.

10. The portable collapsible cooking apparatus of claim 2 wherein said means for rotational engagement of said first side edge of said back wall to said first side edge of said first sidewall comprises:

a first mounting wall extending substantially normal from said back wall for a first distance; and a hinge engaged with both said first mounting wall and said first sidewall.

11. The portable collapsible cooking apparatus of claim 5 wherein said means for rotational engagement of said first side edge of said back wall to said first side edge of said first sidewall comprises:

a first mounting wall extending substantially normal from said back wall for a first distance; and a hinge engaged with both said first mounting wall and said first sidewall.

12. The portable collapsible cooking apparatus of claim 7 wherein said means for rotational engagement of said first side edge of said back wall to said first side edge of said first sidewall comprises:

a first mounting wall extending substantially normal from said back wall for a first distance; and a hinge engaged with both said first mounting wall and said first sidewall.

13. The portable collapsible cooking apparatus of claim 8 wherein said means for rotational engagement of said first side edge of said back wall to said first side edge of said first sidewall comprises:

a first mounting wall extending substantially normal from said back wall for a first distance; and a hinge engaged with both said first mounting wall and said first sidewall.

14. The portable collapsible cooking apparatus of claim 6 wherein said means for rotational engagement of said first side edge of said back wall to said first side edge of said first sidewall comprises:

a first mounting wall extending substantially normal from said back wall for a first distance; and a hinge engaged with both said first mounting wall and said first sidewall.

15. The portable collapsible cooking apparatus of claim 1 additionally comprising said means for rotational engagement of said first side edge of said back wall to said first side edge of said first sidewall comprises:

a first mounting wall extending substantially normal from said back wall for a first distance; and a hinge engaged with both said first mounting wall and said first sidewall;

said means for rotational engagement of said second side edge of said back wall to said second side edge of said second comprises;

a second mounting wall extending substantially normal from said back wall for a second distance at an edge opposite said first mounting wall; and a second hinge engaged with both said second mounting wall and said second sidewall.

16. The portable collapsible cooking apparatus of claim 2 additionally comprising said means for rotational engagement of said first side edge of said back wall to said first side edge of said first sidewall comprises:

a first mounting wall extending substantially normal from said back wall for a first distance; and a hinge engaged with both said first mounting wall and said first sidewall;

said means for rotational engagement of said second side edge of said back wall to said second side edge of said second comprises;

a second mounting wall extending substantially normal from said back wall for a second distance at an edge opposite said first mounting wall; and a second hinge engaged with both said second mounting wall and said second sidewall.

17. The portable collapsible cooking apparatus of claim 3 additionally comprising said means for rotational engagement of said first side edge of said back wall to said first side edge of said first sidewall comprises:

a first mounting wall extending substantially normal from said back wall for a first distance; and a hinge engaged with both said first mounting wall and said first sidewall;

said means for rotational engagement of said second side edge of said back wall to said second side edge of said second comprises:

a second mounting wall extending substantially normal from said back wall for a second distance at an edge opposite said first mounting wall; and a second hinge engaged with both said second mounting wall and said second sidewall.

18. The portable collapsible cooking apparatus of claim 15 additionally comprising:

said second distance being larger than said first distance thereby forming a compartment between said first mounting wall and said second mounting wall and behind said second sidewall, said compartment dimensioned for containment of said first sidewall and said door and said support plate when said cooking apparatus is folded to said collapsed position.

19. The portable collapsible cooking apparatus of claim 16 additionally comprising:

said second distance being larger than said first distance thereby forming a compartment between said first mounting wall and said second mounting wall and behind said second sidewall, said compartment dimensioned for containment of said first sidewall and said door and said support plate when said cooking apparatus is folded to said collapsed position.

20. The portable collapsible cooking apparatus of claim 17 additionally comprising:

said second distance being larger than said first distance thereby forming a compartment between said first mounting wall and said second mounting wall and behind said second sidewall, said compartment dimensioned for containment of said first sidewall and said door and said support plate when said cooking apparatus is folded to said collapsed position.

* * * * *